(12) United States Patent
Katsurahira

(10) Patent No.: US 7,149,647 B2
(45) Date of Patent: Dec. 12, 2006

(54) POSITION POINTING DEVICE

(75) Inventor: Yuji Katsurahira, Kaco (JP)

(73) Assignee: Wacom Co., Ltd., Saitama-ken (JP)

( * ) Notice: Subject to any disclaimer, the term of this patent is extended or adjusted under 35 U.S.C. 154(b) by 117 days.

(21) Appl. No.: 10/868,351

(22) Filed: Jun. 16, 2004

(65) Prior Publication Data

US 2005/0043918 A1    Feb. 24, 2005

(51) Int. Cl.
    *G06F 15/00* (2006.01)
(52) U.S. Cl. ...................... 702/150; 702/127
(58) Field of Classification Search ............. 178/20.01; 702/150, 127; 715/754
    See application file for complete search history.

(56) References Cited

U.S. PATENT DOCUMENTS

| | | | | |
|---|---|---|---|---|
| 5,557,076 A | * | 9/1996 | Wieczorek et al. | 178/18.03 |
| 5,914,710 A | * | 6/1999 | Chen et al. | 345/179 |
| 2003/0217871 A1 | * | 11/2003 | Chao et al. | 178/18.01 |

OTHER PUBLICATIONS

Fletcher, W; "An Engineering Approach to Digital Design"; Prentice-Hall, Englewood Cliffs NJ; 1980; pp. 296-301.*

* cited by examiner

*Primary Examiner*—John Barlow
*Assistant Examiner*—Douglas N Washburn
(74) *Attorney, Agent, or Firm*—Berenato, White & Stavish, LLC

(57) ABSTRACT

A position pointing device includes a resonant circuit, a resonance-characteristic control circuit for controlling characteristics of the resonant circuit in accordance with pointing-device information at timing synchronized with at least part of an electromagnetic wave that is intermittently transmitted from a tablet and for returning the pointing-device information to the tablet, a clock oscillator circuit for generating a clock signal for driving the resonance-characteristic control circuit, and clock starting means for stopping an operation of the clock oscillator circuit when a start condition is set and for starting the operation of the clock oscillator circuit when the resonant circuit generates a signal specified by the start condition. The position pointing device further includes start-condition setting means for setting the start condition in the clock starting means at timing in accordance with an operation of the resonance-characteristic control circuit.

18 Claims, 14 Drawing Sheets

Fig. 11
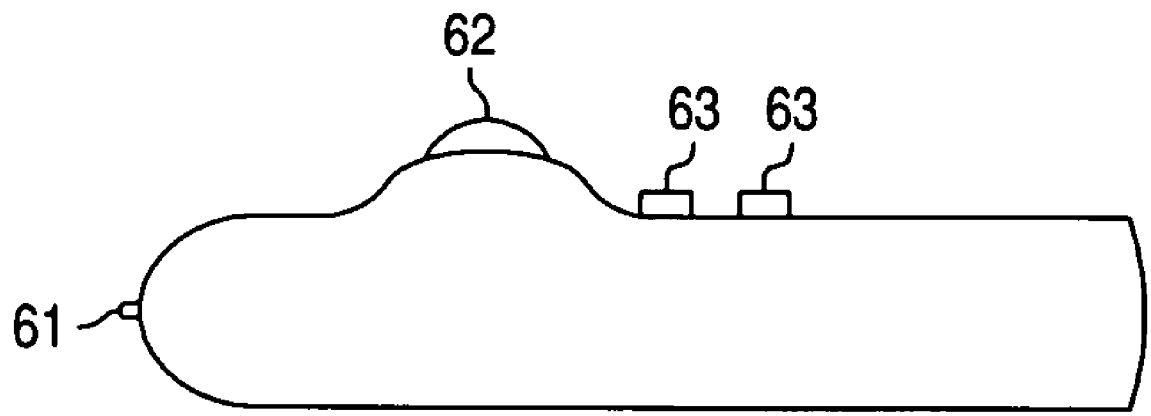
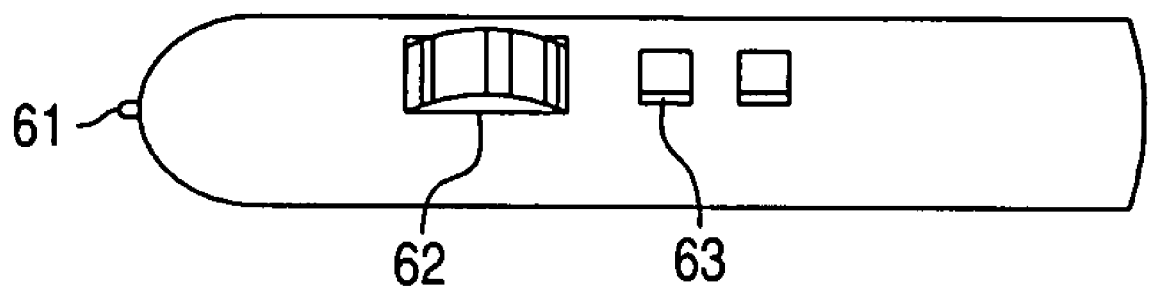

POSITION POINTING DEVICE

CROSS-REFERENCE TO RELATED APPLICATIONS AND CLAIM TO PRIORITY

This application claims the benefit under 35 U.S.C. § 119 of application no. 2003-170960, file Jun. 16, 2003 in Japan, the disclosure of which is incorporated herein by reference.

BACKGROUND OF THE INVENTION

1. Field of the Invention

The present invention relates to improvements in a position pointing device used for an apparatus for detecting a position indicated by the position pointing device utilizing electromagnetic induction.

2. Description of the Related Art

Conventionally, position pointing devices have been known which control characteristics of a resonant circuit provided therein in accordance with data of a switch or a writing pressure at timing synchronized with an electromagnetic wave intermittently transmitted from a tablet and which return the resulting information to the tablet. Examples include Patent Document 1 (Japanese Unexamined Patent Application Publication No. 3-189716), Patent Document 2 (Japanese Unexamined Patent Application Publication No. 7-175572), and Patent Document 3 (Japanese Unexamined Patent Application publication No. 7-200137).

Those position pointing devices can operate on only power that is transmitted from a tablet, i.e., can achieve battery-less configurations, by incorporating a low-power consumption digital circuit (i.e., a gate array) as a primary control circuit using a C-MOS technology. Yet, lower power consumption has been desired in order to allow a reliable operation even with lower power transmitted from the tablet.

The above-described position pointing devices have some problems. Specifically, the digital circuit (the gate array) for use as a control circuit needs to be customized according to applications. This makes it difficult to change the type of pointing-device information or the number of bits to be returned and also makes it impossible to provide a position pointing device that serve purposes. Additionally, cost for design is high.

SUMMARY OF THE INVENTION

Accordingly, an object of the present invention is to provide a technology that can achieve a battery-less operation with low power transmitted from a tablet.

Another object of the present invention is to provide a technology for allowing battery-less position pointing devices for various applications to be put into commercial production with flexibility at a lower design cost in a short period of time.

To achieve the foregoing objects, the present invention provides a position pointing device. The position pointing device includes a resonant circuit, a resonance-characteristic control circuit for controlling characteristics of the resonant circuit in accordance with pointing-device information at timing synchronized with at least part of an electromagnetic wave that is intermittently transmitted from a tablet and for returning the pointing-device information to the tablet, and a clock oscillator circuit for generating a clock signal for driving the resonance-characteristic control circuit. The position pointing device further includes clock starting means for stopping an operation of the clock oscillator circuit when a start condition is set and for starting the operation of the clock oscillator circuit when the resonant circuit generates a signal specified by the start condition. The start condition specifies that, in response to what type of signal generated at the resonant circuit, the clock oscillator circuit is to be started. The position pointing device further includes start-condition setting means for setting the start condition in the clock starting means at timing in accordance with an operation of the resonance-characteristic control circuit. The start condition corresponds to content of controlling performed by the resonance-characteristic control circuit.

As described above, according to the present invention, the clock oscillator circuit can be put into an operation state in only a period in which the resonance-characteristic control circuit needs to be operated and can be put into a stopped state in other periods. This arrangement can reduce power consumption by an amount corresponding to the period of a stopped state. This can achieve a battery-less operation even with lower power transmitted from a tablet.

In this case, as the resonance-characteristic control circuit, a microprocessor (CPU) may be used that includes a ROM, RAM, and a clock oscillator circuit and that operates in accordance with a program that has been created in advance and that has been written into the ROM. This arrangement can significantly facilitate changes in functions of the position pointing device and in the amount of data to be returned, by changing the program. Further, the arrangement can put position pointing devices for various applications into commercial production with flexibility at a lower design cost in a short period of time.

FIG. 1 is a diagram showing a basic configuration of a position pointing device according to the present embodiment. The position pointing device generally includes a resonant circuit 11, a variable-characteristic circuit 12, a power extracting circuit 13, a power-supply capacitor 14, clock starting means 15, a clock oscillator circuit 16, a resonance-characteristic control circuit 17, and start-condition setting means 18.

The resonant circuit 11 includes a coil 11a and a capacitor 11b and has a resonant frequency that is substantially the same as the frequency of an electromagnetic wave transmitted from a tablet. Under the control of the resonance-characteristic control circuit 17, the variable-characteristic circuit 12 changes characteristics of the resonant circuit 11. Examples of the characteristics include a resonant frequency and a loss. The power extracting circuit 13 rectifies an induced AC voltage generated in the resonant circuit 11, stores the rectified voltage in the power-supply capacitor 14, and supply the power to the individual circuit.

The start-condition setting means 18 sets a start condition. The start condition specifies that, in response to what type of signal generated at the resonant circuit, the clock oscillator circuit 16 is to be started. In response to the setting of the start condition, the clock starting means 15 stops the operation of the clock oscillator circuit 16. When the resonant circuit 11 generates a signal specified by the start condition, the clock starting means 15 generates an oscillation control signal for starting the operation of the clock oscillator circuit 16.

The clock oscillator circuit 16 generates a clock signal for driving the resonance-characteristic control circuit 17. The operation of the clock oscillator circuit 16 is turned on or off in response to the oscillation control signal output from the clock starting means 15.

In response to the clock signal supplied from the clock oscillator circuit 16, the resonance-characteristic control circuit 17 operates and, in accordance with pointing-device information, the resonance-characteristic control circuit 17 controls the characteristics of the resonator circuit 11 at timing synchronized with at least part of an electromagnetic wave intermittently transmitted from the tablet. In this case, the resonance-characteristic control circuit 17 switches a characteristic control signal for operating the variable-characteristic circuit 12 to a high or low level in accordance with pointing-device information, and also sends a notification indicating the end of the operation to the start-condition setting means 18.

Upon the end of operation of the resonance-characteristic control circuit 17, the start-condition setting means 18 sets a start condition in the clock starting means 15.

The variable-characteristic circuit 12 may have a configuration in which a small-capacitance is connected via an analog switch so as to slightly change the frequency of a signal returned from the resonant circuit 11 to the tablet, or may have a configuration in which a resistor is connected via an analog switch so as to change the level of a signal returned from the resonant circuit 11 to the tablet. Alternatively, a variable capacitor or a variable resistor may be used so as to continuously change a frequency and/or a signal level.

FIG. 2 is a waveform view showing the operation of the basic configuration shown in FIG. 1.

The resonant circuit 11 generates a signal (b) in response to an electromagnetic wave (a) intermittently transmitted from the tablet. The clock starting means 15 includes a circuit (e.g., a detection circuit and a comparator) for detecting the signal (b) to thereby generate a signal (b') that is synchronized with transmission timing. When the start condition specifies that the clock oscillator circuit 16 is started upon detection of the rising edge of the signal (b'), an oscillation control signal (c) output from the clock starting means 15 is synchronized with the rising edge of the signal (b') and is put into an on state, thereby starting the clock oscillator circuit 16.

When the clock oscillator circuit 16 is started to generate a clock signal (d), the resonance-characteristic control circuit 17 starts operation to set a characteristic control signal (e) for controlling the variable-characteristic circuit 12 in accordance with pointing-device information. After the end of the setting operation, the resonance-characteristic control circuit 17 sends a notification indicating the end of the setting operation to the start-condition setting means 18. In turn, the start-condition setting means 18 sets a similar start condition to that described above in the clock starting means 15. Thus, the oscillation control signal (c) output from the clock starting means 15 is put into an off state, thereby stopping the operation of the clock oscillator circuit 16.

When the operation of the clock oscillator circuit 16 stops, the operation of the resonance-characteristic control circuit 17 also stops, so that electrical current consumed via the power-supply capacitor 14 significantly decreases.

The resonance-characteristic control circuit 17 has a function for maintaining the level of the characteristic control signal (e) during the period in which the operation of the resonance-characteristic control circuit 17 is stopped.

As described above, the present invention can reduce the period in which the resonance-characteristic control circuit 17 operates and can significantly reduce the average of consumed current. This can provide a battery-less position pointing device even with less power transmitted from a tablet. In addition, a microprocessor (CPU) may be used for the resonance-characteristic control circuit 17. With such a configuration, changing a program written to the CPU can facilitate a change in the functions of the position pointing device.

The clock oscillator circuit may operate in accordance with a charging/discharging operation of a capacitor. The charging/discharging operation is controlling by the clock starting means so as to be put into an operating or stopped state.

The position pointing device may further include number-of-transmission counting means. The number-of-transmission counting means counts the number of transmissions when the tablet intermittently transmits an electromagnetic wave. When the number of transmissions counted by the number-of-transmission counting means reaches a predetermined value, the resonance-characteristic control circuit controls the characteristics of the resonant circuit in accordance with specific information in the pointing-device information.

The position pointing device may further include a time-constant circuit for setting a period in which the resonance-characteristic control circuit performs controlling. Generation of a signal from the time-constant circuit may be used together as one start condition set by the start-condition setting means.

In this case, an electromagnetic wave that is intermittently radiated from the tablet with at least first and second duration times may be received. When an electromagnetic wave that is transmitted with the first duration time is received, the counting of the number of transmissions of the electromagnetic wave that is repeatedly transmitted with the second duration time may be started.

The position pointing device may further include transmission-duration-time detecting means for receiving an electromagnetic wave that is intermittently transmitted from the tablet with at least two duration times and for detecting duration time of each transmission of the electromagnetic wave. The electromagnetic wave includes control information for the position pointing device. The position pointing device may further include control-information extracting means for extracting the control information transmitted from the tablet in accordance with each detected individual transmission duration time or a combination of the transmission duration times. The characteristics of the resonant circuit are controlled in accordance with predetermined pointing-device information based on the extracted control information.

In this case, the transmission-duration-time detecting means may include transmission-duration-time determining means that includes an integration circuit having a predetermined time constant and a comparator.

The position pointing device may further include continuous-amount detecting means for detecting information corresponding to an operation expressed in a continuous amount, and analog-to-digital converting means for converting the detected continuous amount into a digital value. The characteristics of the resonant circuit are sequentially controlled in accordance with the continuous amount converted into the digital value.

In this case, the continuous-amount detecting means may include a time constant circuit. The time constant circuit includes an element having a continuously-variable characteristic. The continuous-amount detecting means detects the continuous amount by counting the number of signal waves generated at the resonant circuit during a period defined by a time constant of the time-constant circuit. Generation of a signal from the time-constant circuit may be used together as one start condition set by the start-condition setting means.

In addition, the position pointing device may further include a power extracting circuit for extracting power from the signal generated at the resonant circuit.

BRIEF DESCRIPTION OF THE DRAWINGS

FIG. 11 is an external appearance of the third embodiment;

DESCRIPTION OF THE PREFERRED EMBODIMENTS

First Embodiment

Configuration of First Embodiment

Figure 1:
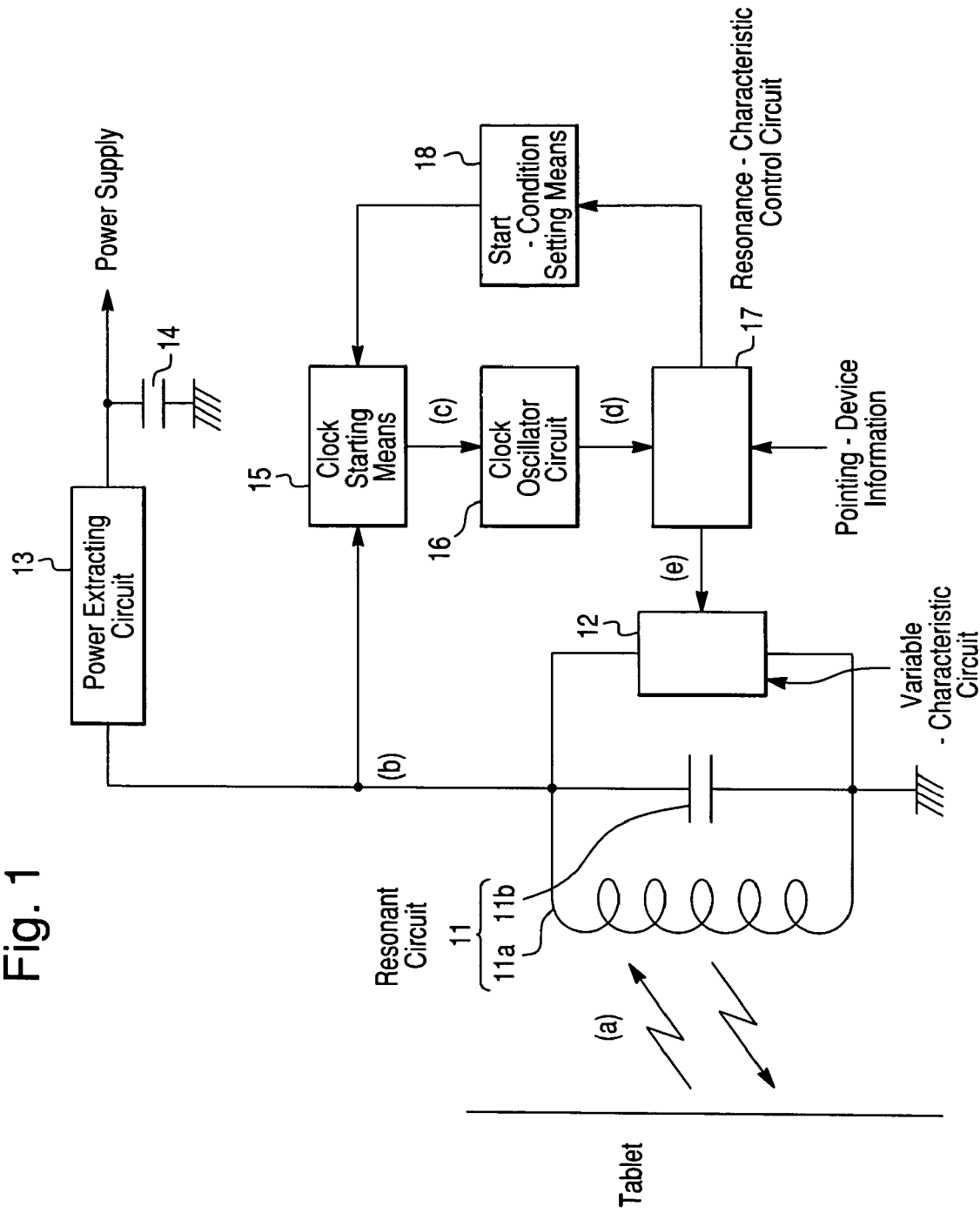
FIG. 1 is a diagram showing a basic configuration of a position pointing device of the present invention.
Figure 2:
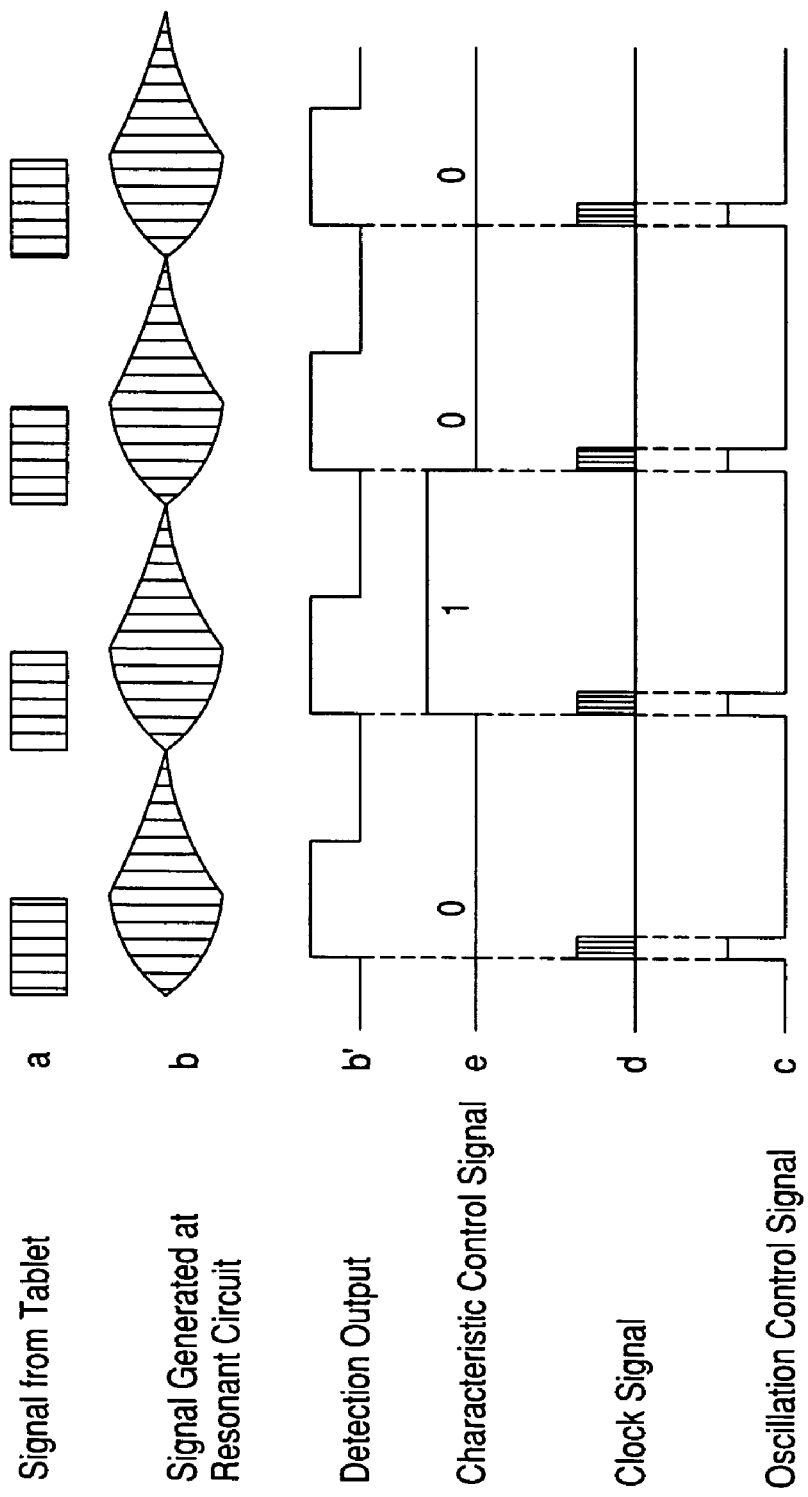
FIG. 2 is a waveform view showing a basic operation of the position pointing device of the present invention.
Figure 3:
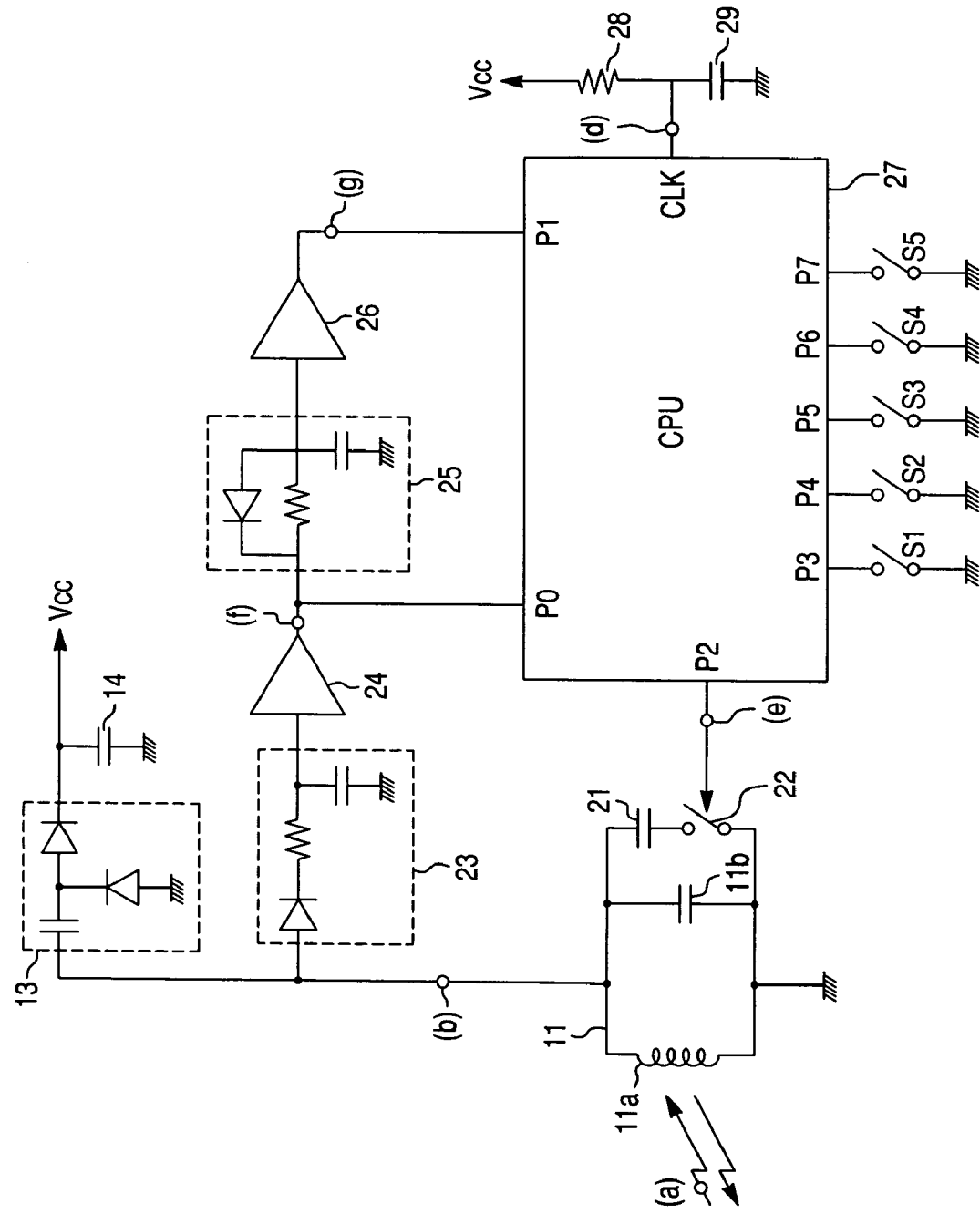
FIG. 3 is a circuit diagram of a first embodiment of the present invention.

FIG. 3 shows the configuration of a position pointing device according to a first embodiment of the present invention. The same elements and portions as those shown in FIG. 1 are denoted with the same reference numerals. The position pointing device of the present embodiment generally includes a resonant circuit 11, a power extracting circuit 13, a power-supply capacitor 14, capacitors 21 and 29, a switch 22, a detection circuit 23, comparators 24 and 26, an integration circuit 25, a microprocessor or CPU 27, and a resistor 28.

The capacitor 21 has a considerably small capacitance compared to a capacitor 11b and is connected to two opposite ends of the capacitor 11b via the switch 22. The resonant frequency of the resonant circuit 11 is slightly changed in response to the turning on or off of the switch 22.

The detection circuit 23 and the comparator 24 supply a signal to the CPU 27 in accordance with the transmission timing of an electromagnetic wave intermittently transmitted from a tablet. When the duration time of the electromagnetic wave transmitted from the tablet exceeds a certain value, the integration circuit 25 and the comparator 26 generate a signal and supply the signal to the CPU 27.

The CPU 27 may be a known microprocessor having a ROM (read only memory), a RAM (random access memory), and a clock generator circuit. What is used herein is a type that generates a clock signal having a frequency defined by a time constant of the resistor 28 and the capacitor 29, which are externally connected.

In general, a CPU has a plurality of input/output terminals, which can be arbitrarily set by a program written to a ROM. In the present embodiment, eight input/output terminals of those provided at the CPU 27 are used, as shown in FIG. 3.

Specifically, a terminal P0 is set as an input terminal to supply a signal from the comparator 24. A terminal P1 is also set as an input terminal to supply a signal from the comparator 26. A terminal P2 is set as an output terminal and is connected to the switch 22 to control the turning on or off of the switch 22. Terminals P3 to P7 are set as input terminals to detect the operational states of switches S1 to S5, respectively. In order to read the states of the terminals P3 to P7, the CPU 27 needs to temporarily put the terminals P3 to P7 into pull-up states (i.e., in states in which the terminals P3 to P7 are internally connected to a power supply via resistors).

Herein, the capacitor 21 and the switch 22 constitute the variable-characteristic circuit 12 shown in FIG. 1, and the detection circuit 23, the comparators 24 and 26, the integration circuit 25, and the controlling of the CPU 27 constitute the clock starting means 15 shown in FIG. 1. The resistor 28, the capacitor 29, and the clock generator circuit in the CPU 27 constitute the clock oscillator circuit 16 shown in FIG. 1, and the controlling of the CPU 27 provides the resonance-characteristic control circuit 17 and the start-condition setting means 18 shown in FIG. 1.

Operation of First Embodiment

Figure 4:
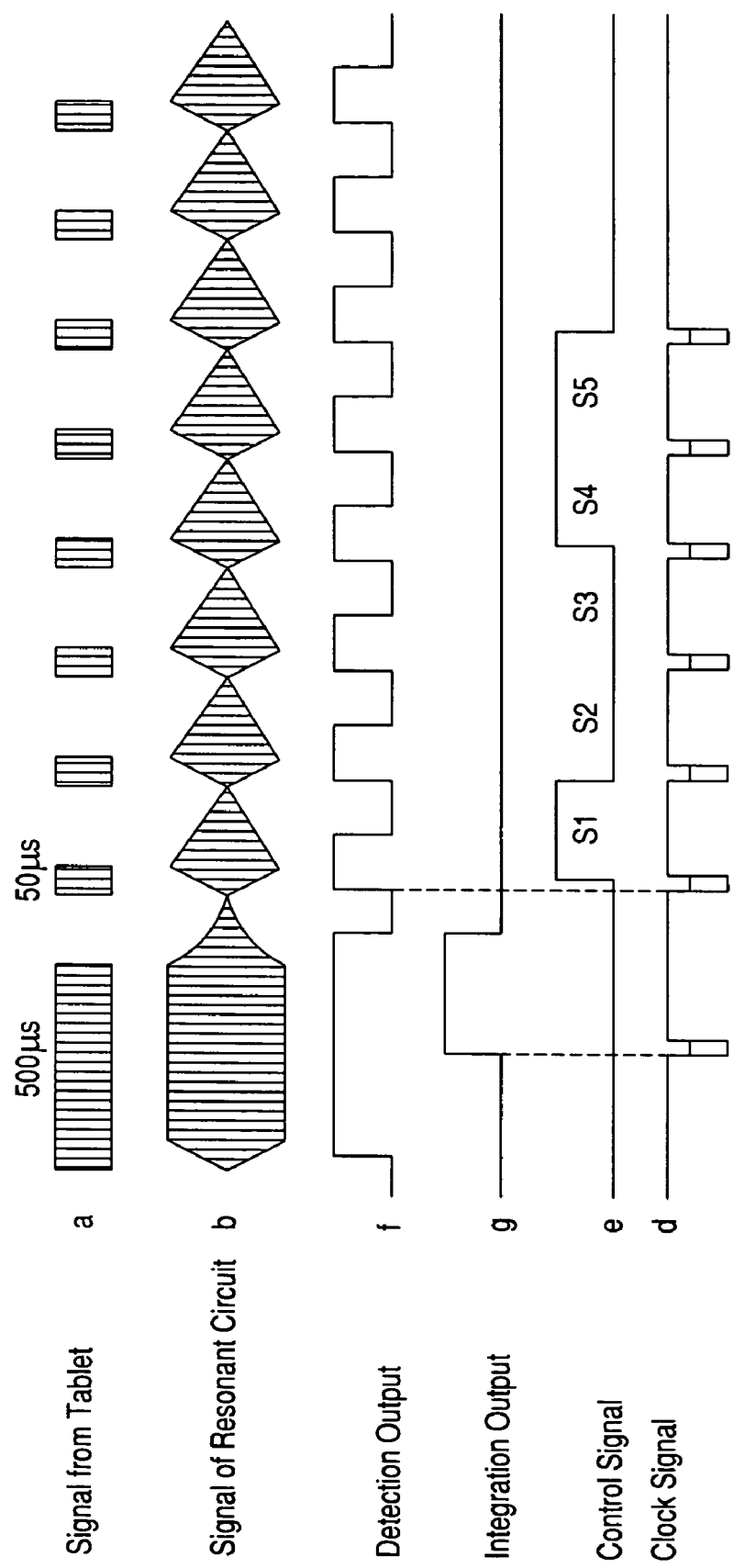
FIG. 4 is a waveform view of the operation of the first embodiment.

The overview of operation of the first embodiment having the above-described configuration will now be described. FIG. 4 shows the operation of the first embodiment of the present invention. In FIG. 4, waveforms (a) to (g) correspond to signal waveforms of the portions indicated by the same reference characters shown in FIG. 3.

In order to detect the operational states of the switches S1 to S5 provided in the position pointing device, an electromagnetic wave is transmitted from the tablet at timing shown at the waveform (a) in FIG. 4. That is, after a long transmission of about 500 μs, a transmission stopping period of about 100 μs is provided and a short transmission of about 50 μs and a transmission stopping period (a reception period of the tablet) of about 100 μs are repeated. During the five short transmission/reception operations subsequent to the long transmission, the tablet detects the operational states of the switches S1 to S5.

Figure 5:
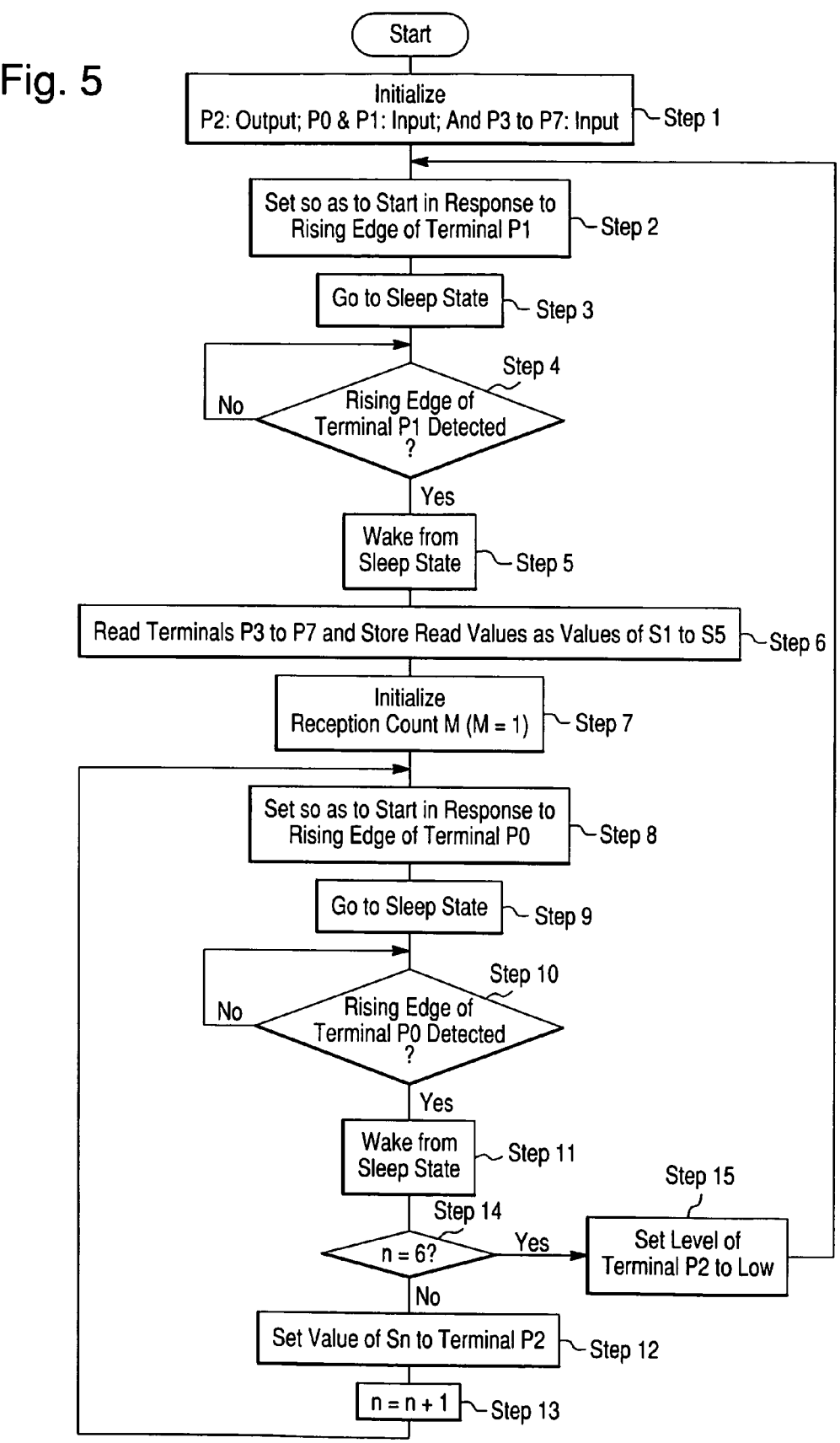
FIG. 5 is a flow chart of the operation of the first embodiment.

FIG. 5 is a flow chart of the operation of CPU 27 in the present embodiment. A detailed description will be given of the operation with reference to the flow chart.

When the position pointing device shown in FIG. 3 is placed on the tablet, a signal output from the tablet causes the resonant circuit 11 to generate a signal. This signal causes the power-supply capacitor 14 to be charged. When the voltage exceeds a certain level, the CPU 27 starts operation. First, the CPU 27 puts the terminal P2 into a low level output state and puts the terminals P0, P1, and P3 to P7 into input states (in step 1).

Subsequently, the CPU 27 performs setting (in step 2) so as to start operation in response to the rising edge of a signal from the terminal P1 and then goes into a sleep state (in step 3). In the sleep state, the clock signal (d) shown in FIG. 3 does not vary, so that the amount of electrical current flowing from the power-supply capacitor 14 is very small. This is one feature of the present invention.

Next, as shown in FIG. 4, the tablet performs a long transmission of about 500 µs. During the transmission, the level of the terminal P1 of the CPU 27 changes to high (in step 4). The CPU 27 then starts operation (in step 5).

First, the CPU 27 puts the terminals P3 to P7 into pull-up states to detect the operational states of the switches S1 to S5 and stores the detected operational states (in step 6). After the completion of detection of the switches S1 to S5, the CPU 27 releases the pull-up of the terminals P3 to P7 in order to reduce electrical-current consumption.

Subsequently, the CPU 27 initializes a reception count n (n=1), i.e., the number of receptions (in step 7). The CPU 27 performs setting (in step 8) so as to allow starting from the sleep state in response to the rising edge of a signal from the terminal P0. Thereafter, the CPU 27 stops the oscillation and goes into the sleep state (in step 9).

Next, as shown in FIG. 4, the tablet performs a short transmission (a first short transmission) of about 50 µs.

In response to the short transmission, the level of the terminal P0 of the CPU 27 changes to high (in step 10). The CPU 27 starts operation (in step 11). The CPU 27 controls the terminal P2 in accordance with the state of the already-detected switch S1 terminal (in step S12).

For example, when the switch S1 is in an on state, the level of the terminal P2 goes high and the control switch 22 is turned on. Consequently, the resonant frequency of the resonant circuit 11 becomes slightly lower than its normal frequency. This change in frequency is detected by the tablet as the operational state of the switch, as in the conventional manner.

Subsequently, the CPU 27 adds "1" to the reception count n (in step 13). In the same manner described above, the CPU 27 performs setting so as to allow starting from the sleep state in response to the rising edge of a next signal output from the terminal P0 and goes into the sleep state again (in steps 8 and 9).

Thereafter, when the tablet performs a second short transmission, the CPU 27 starts operation, in the same manner described above, to control the terminal P2 in accordance with the result of detection of the switch S2 so that the level of the terminal P2 goes high or low. The CPU 27 then performs setting so as to allow starting from the sleep state in response to the rising edge of a next signal from the terminal P0 and goes into the sleep state again.

In this manner, until a fifth short transmission subsequent to the long transmission, information corresponding to the operations of the switches S1 to S5 is returned to the tablet (in steps 8 to 13).

Thereafter, the tablet performs a sixth short transmission, so that the CPU 27 starts operation (in step 14). At this time, the CPU 27 sets the level of the terminal P2 to low (in step 15). Further, the CPU 27 performs processing so that the next start is initiated in response to the rising edge of the terminal P1 rather than the terminal P0 and goes into the sleep state (in steps 2 and 3).

This is because the transmission of all operational information is completed and, thereafter, the CPU 27 does not need to operate while the tablet continuously performs transmission/reception for detecting the coordinates of the position pointing device. This operation is one feature of the present invention.

Extensions of First Embodiment

FIG. 4 shows a state when the switches S1, S4, and S5 are operated. A tablet having a configuration for detecting a change in the resonant frequency of a position pointing device as a change in signal phase may be used for the tablet for use in the present embodiment. Examples include those described in Patent Document 1 or a second embodiment of Japanese Unexamined Patent Application Publication No. 8-171448.

Figure 6:
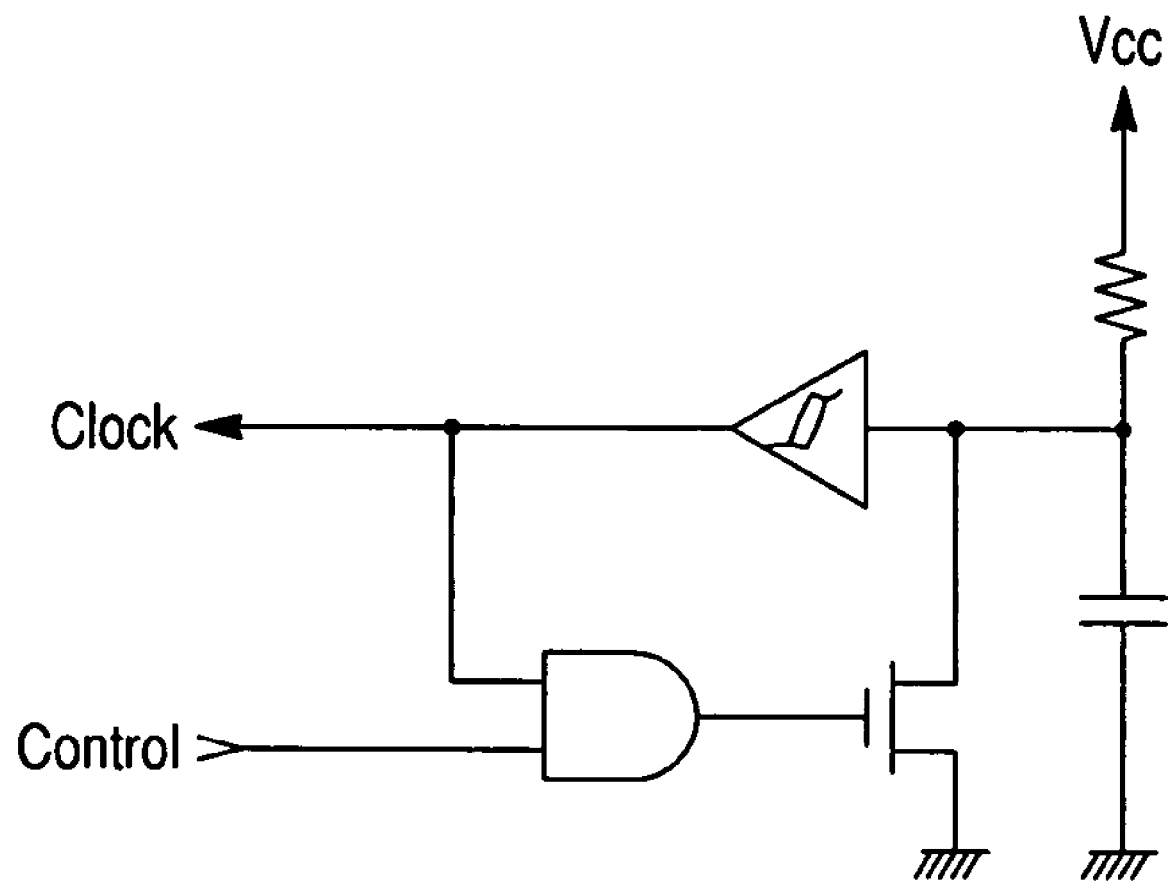
FIG. 6 is a circuit diagram of a specific example of a clock oscillator circuit.

In the present embodiment, an oscillator circuit employing charging/discharging operations performed by the resistor 28 and the capacitor 29 shown in FIG. 3 is used in order to allow quick start and stop of the CPU 27. Specific examples of such an oscillator circuit include the configuration shown in FIG. 6.

While a description in the present embodiment is given of an example in which information corresponding to the operations of the five switches S1 to S5 is returned, the embodiment is not limited five switches. Further, information can be returned without the use of switches. For example, an ID code unique to an individual pointing device may be stored in the ROM so as to be sequentially returned. Alternatively, an ID code and switch-based information may be returned in sequence.

Second Embodiment

Configuration of Second Embodiment

Figure 7:
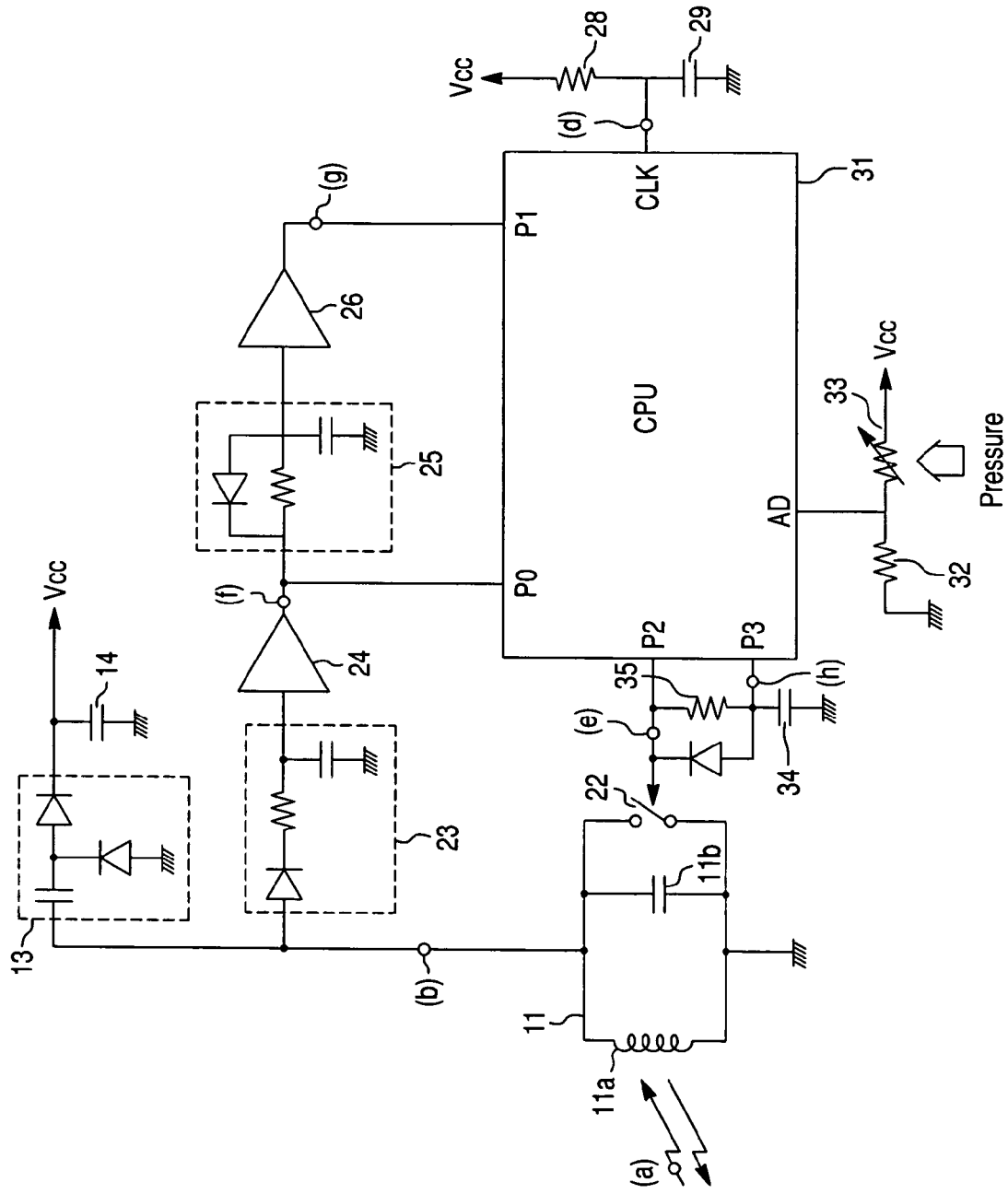
FIG. 7 is a circuit diagram of a second embodiment of the present invention.

FIG. 7 is a circuit diagram of a position pointing device according to a second embodiment of the present invention. In this example, a continuous amount corresponding to an operation of the position pointing device is detected and returned. In FIG. 7, the same elements and portions as those shown in FIG. 3 are denoted with the same reference numerals. The position pointing device according to the second embodiment generally includes a resonant circuit 11, a power extracting circuit 13, a power-supply capacitor 14, a switch 22, a detection circuit 23, comparators 24 and 26, an integration circuit 25, resistors 28, 32, and 35, capacitors 29 and 34, a CPU 31, and a pressure-sensitive resistance element 33.

Unlike the CPU 27 in the first embodiment, the CPU 31 has an analog-to-digital (AD) conversion function. A voltage divided by the resistor 32 and the pressure-sensitive resistance element 33 is generated at an AD terminal of the CPU 31. By detecting the voltage at the AD terminal, the CPU 31 can convert the voltage into a value corresponding to a resistance of the pressure-sensitive resistance element 33, for example, into the writing-pressure level of a pen.

In the present embodiment, the switch 22 is controlled such that the operation of the resonant circuit 11 is stopped for a certain period of time to return information to the tablet. Thus, the position pointing device of the present embodiment includes an integration circuit (i.e., a time-constant circuit) having the capacitor 34 and the resistor 35 in order keep the ON period of the switch 22 constant.

The switch 22 serves as the characteristic-variable circuit 12 in FIG. 1, and the detection circuit 23, the comparators 24 and 26, the integration circuit 25, and the controlling of the CPU 31 constitute the clock starting means 15 in FIG. 1. The resistor 28, the capacitor 29, and a clock generator circuit in the CPU 31 constitute the clock oscillator circuit 16 in FIG. 1, and the controlling of the CPU 31 provides the resonance-characteristic control circuit 17 and the start-condition setting means 18 in FIG. 1.

Operation of Second Embodiment

Figure 8:
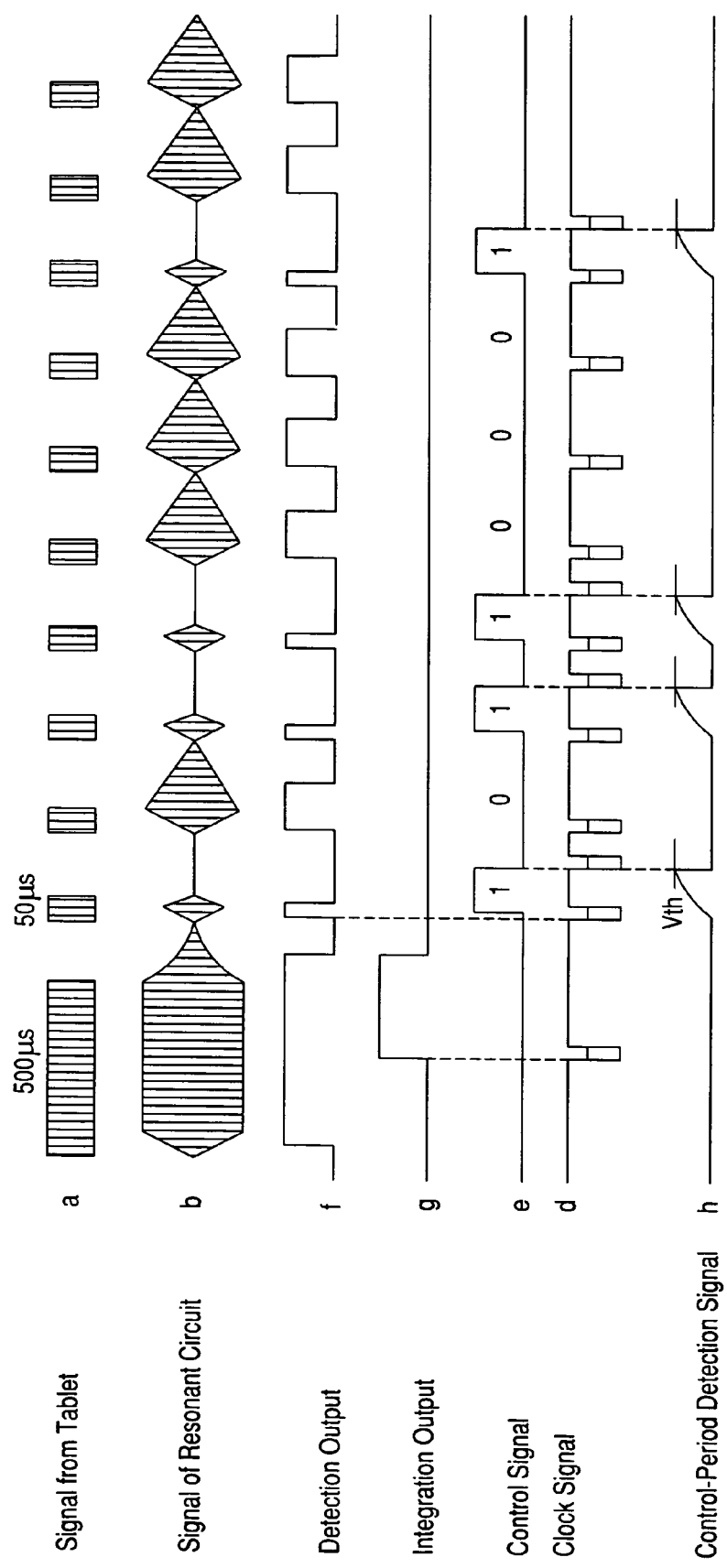
FIG. 8 is a waveform view of the operation of the second embodiment.

Now, the overview of operation of the second embodiment having the above-described configuration will be described. FIG. 8 shows the operation of the second embodiment of the present invention. In FIG. 8, waveforms (a) to (h) correspond to signal waveforms of the portions indicated by the same reference characters shown in FIG. 7. General operations of the terminals are analogous to those in the first embodiment. The signal waveform (h) indicates a change in voltage across the capacitor 34, and the signal is supplied to a terminal P3 of the CPU 31.

In order for the tablet to detect the a pressure that is applied to the pressure-sensitive resistance element 33 in response to the operation, the tablet transmits an electromagnetic wave at timing indicated by waveform (a) in FIG. 8, in the same manner as the first embodiment.

That is, after a long transmission of about 500 μs, a transmission stopping period of about 100 μs is provided and a short transmission of about 50 μs and a transmission stopping period (a reception period of the tablet) of about 100 μs are repeated. During eight short transmission/reception operations subsequent to the long transmission, a pressure applied to the pressure-sensitive resistance element 33 is converted into an eight-bit value (D0 to D7), which is returned to the tablet.

Figure 9:
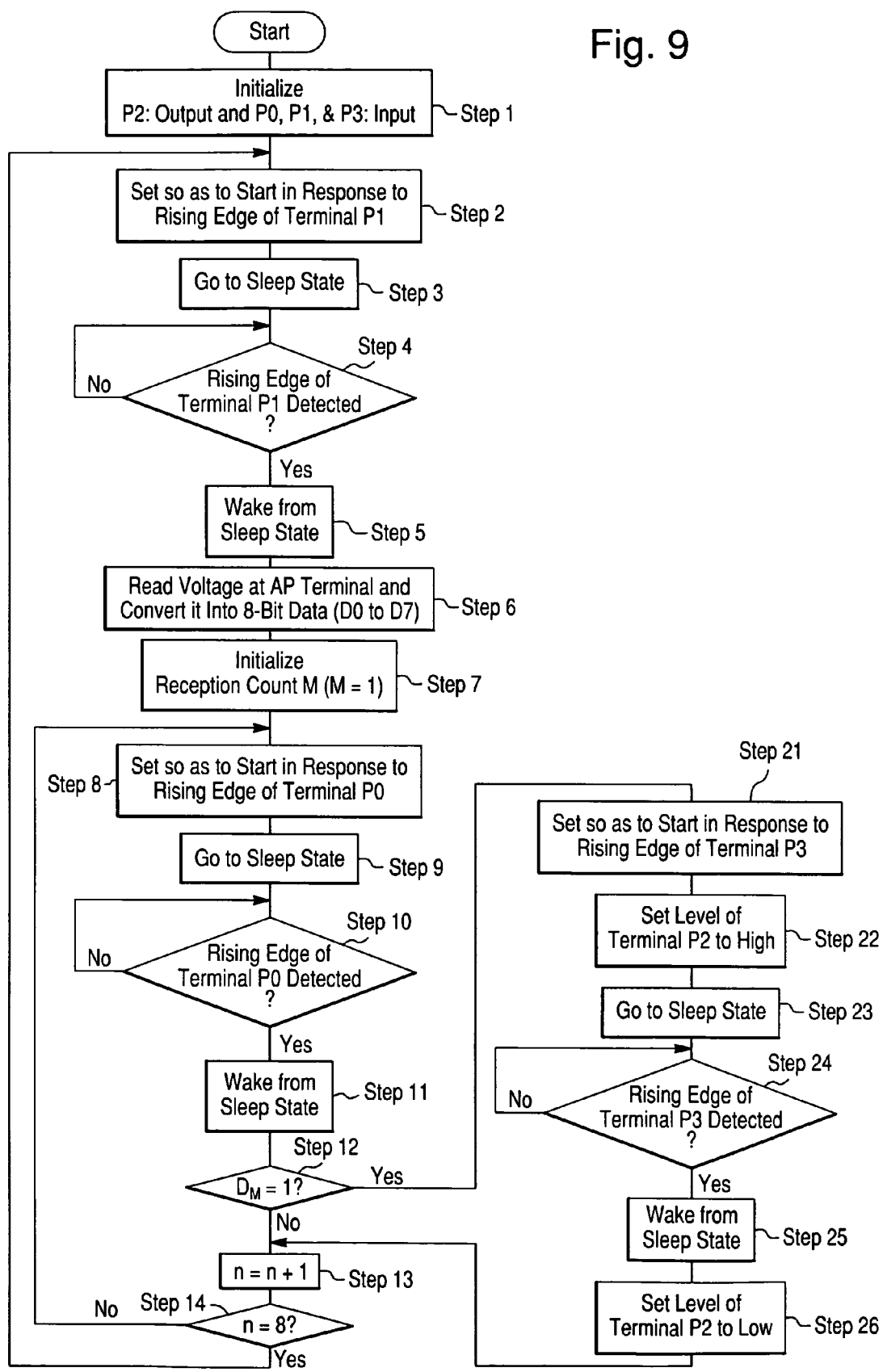
FIG. 9 is a flow chart of the operation of the second embodiment.

FIG. 9 is a flow chart of the operation of the CPU 31 in the present embodiment. A detailed description will be given of the operation with reference to the flow chart.

When the position pointing device shown in FIG. 7 is placed on a tablet, a signal output from the tablet causes the resonant circuit 11 to generate a signal. This signal causes the power-supply capacitor 14 to be charged. When the voltage exceeds a certain level, the CPU 31 starts operation. First, the CPU 31 puts the terminal P2 into a low-level output state and puts the terminals P0, P1, and P3 into input states (in STEP 1).

Subsequently, the CPU 31 performs setting (in step 2) so as to start operation in response to the rising edge of a signal from the terminal P1 and goes into a sleep state (in step 3). In the sleep state, the clock signal (d) shown in FIG. 7 does not vary, so that the amount of electrical current flowing from the power-supply capacitor 14 is very small.

Next, as shown in FIG. 8, the tablet performs a long transmission of about 500 μs is performed. During the transmission, the level of the terminal P1 of the CPU 31 changes to high (in step 4). The CPU 31 then starts operation (in step 5).

The CPU 31 first performs AD conversion on a voltage applied to the AD terminal. The CPU 31 converts a value obtained by the AD conversion into an eight-bit AD value (D0 to D7) according to a predetermined numerical calculation or conversion table and stores the AD value (in step 6).

Subsequently, the CPU 31 initializes a reception count n (n=0) (in step 7). The CPU 31 then performs setting (in step 8) so as to allow starting from the sleep state in response to the rising edge of a signal from the terminal P0. Subsequently, the CPU 31 stops the oscillation and goes into the sleep state (in step 9).

Next, as shown in FIG. 8, the tablet performs a short transmission (a first short transmission) of about 50 μs.

In response to the short transmission, the level of the terminal P0 of the CPU 31 changes to high (in step 10). As a result, the CPU 31 starts operation (in step 11) and changes processing in response to the value of data D0 of the obtained eight-bit data (in step 12).

When the value of data D0 is "0", the CPU 31 adds "1" to the reception count n (in step 13) and the process returns to step 8, in which the CPU 31 performs setting so as to allow starting from the sleep state in response to the rising edge of a next signal from the terminal P0 and goes into the sleep state again (in steps 8 and 9). When the value of data D0 is "1", the CPU 31 performs the following processing in steps 21 to 26 before returning to step 8.

First, the CPU 31 performs setting so as to allow starting in response to the rising edge of a signal from the terminal P3 (in step 21). Subsequently, the CPU 31 sets the terminal P2 to a high level (in step 22) and goes into the sleep state (in step 23). When the level of the terminal P2 goes high, the control switch 22 is turned on to cause the resonant circuit 11 to be short-circuited, so that no signal is detected by the tablet. When the level of the terminal P2 changes to a high level, the capacitor 34 is charged with time. After a certain amount of time elapses, the voltage across the capacitor 34 reaches a threshold level $V_{th}$ of the terminal P3 of the CPU 31. In response to the rising edge of the terminal P3, the CPU 31 starts operation (in steps 24 and 25). The CPU 31 returns the terminal P2 to the low level (in step 26) and ends the processing for a case in which data D0 is "1". This is one feature of the present invention.

The ON period of the switch 22 is determined in accordance with a time constant of the resistor 35 and the capacitor 34 and is about 70 to 100 μs in the present embodiment. This is because it is preferable that the controlling of the switch 22 is finished before the tablet starts the transmission.

Since the processing for returning the value of data D0 in response to the first transmission subsequent to the long transmission has finished, a preparation for returning the value of data D1 in response to a second transmission is performed next. That is, the CPU 31 performs setting so as to allow starting in response to the rising edge of the terminal P0 and goes into the sleep state again (in steps 8 and 9).

When the tablet performs a second short transmission, similarly, the CPU 31 starts operation and repeats the above-described operations to control the switch 22 in response to the value of data D1.

In this manner, values of the data D0 to D7 are returned to the tablet until the end of an eighth short transmission subsequent to the long transmission (in steps 8 to 14).

When the processing for returning the value of the data D7 is completed in response to the eighth short transmission from the tablet, the CPU 31 performs setting so that the next start is initiated in response to the rising edge of the terminal P1 rather than the terminal P0 and goes into the sleep state (in steps 2 and 3)

This is because the transmission of all operational information is completed and, thereafter, the CPU 31 does not need to operate while the tablet continuously performs transmission/reception for detecting the coordinates of the position pointing device. This is one feature of the present invention.

Extensions of Second Embodiment

FIG. 8 shows a case in which data to be returned has "1, 0, 0, 0, 1, 1, 0, 1" from the top, and the data is returned from the bottom (D0). The data, however, may be returned from the top.

Further, while the pressure-sensitive resistance element is used to detect a continuous amount in the present embodiment, another sensor may be used.

While only values detected by the pressure-sensitive resistance element are used as data to be returned, a switch or the like may be provided so that a value obtained from the switch is returned together or an ID code or the like may be returned together.

For the tablet for use in the present embodiment, one having a configuration for detecting information of an operation or the like as a signal level in accordance with the presence/absence of a signal from the position pointing device may be used. Examples include those having configurations disclosed in a first embodiment of Japanese Unexamined Patent Application Publication No. 8-171448 and Japanese Unexamined Patent Application Publication No. 8-30374.

Third Embodiment

Configuration of Third Embodiment

Figure 10:
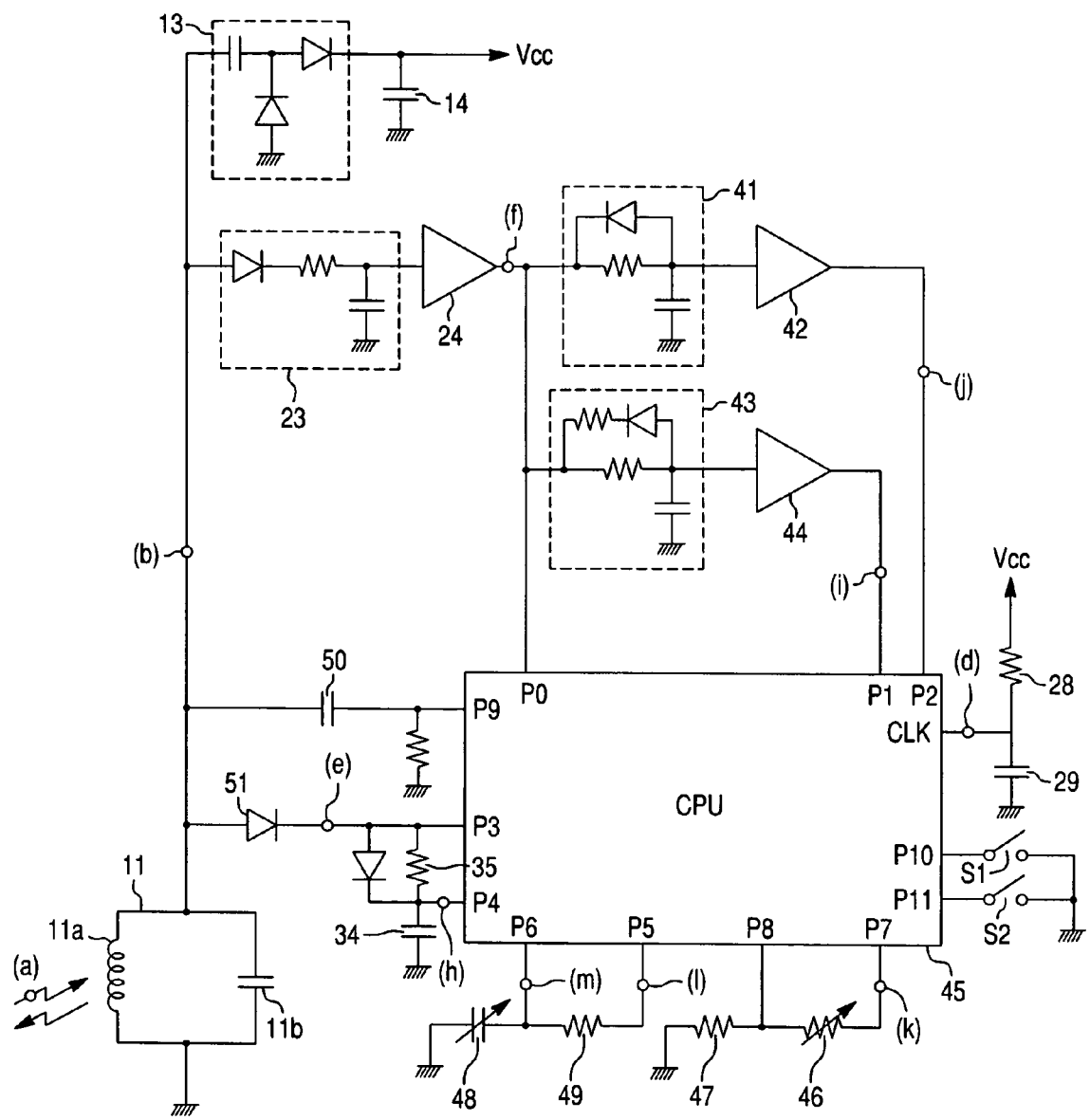
FIG. 10 is a circuit diagram of a third embodiment of the present invention.

FIG. 10 is a circuit diagram of a position pointing device according to a third embodiment of the present invention. In this example, data to be returned can be selected in accordance with information transmitted from a tablet. In FIG. 10, the same elements and portions as those in FIG. 7 are denoted with the same reference numerals. The position pointing device according to the third embodiment generally includes a resonant circuit 11, a power extracting circuit 13, a power-supply capacitor 14, a detection circuit 23, comparators 24, 42, and 44, integration circuits 41 and 43, resistors 28, 35, 47, and 49, capacitors 29, 34, and 50, a CPU 45, a variable resistor 46, a variable capacitor 48, and a diode 51.

FIG. 11 shows an external appearance of the position pointing device according to the present embodiment. Reference numeral 61 indicates a pen tip that detects a writing pressure. Reference numeral 62 indicates a dial that allows for sequential adjustment of the amount of rotation. The dial 62 is used to adjust, for example, a line width and a color intensity. Reference 63 indicates buttons.

A unique configuration of the present embodiment will now be described with reference to FIG. 10.

The time constant of the integration circuit 41 is set to be sufficiently large compared to the time constant of the integration circuit 43. The integration circuit 43 has a small time constant when a signal from the comparator 24 rises. A signal from the comparator 44 is adapted to fall with a short delay from the rising edge of an output of the comparator 24. This is because, as described below, upon starting in response to the rising edge of the terminal P0 of the CPU 45, the CPU 45 determines the duration time of each transmission from the tablet by referring to the value of the terminal P1.

The CPU 45 has a feature in that two types of variable elements and switches are connected and operations thereof can be detected. A ROM in the CPU 45 has a specific area in which an ID code that is unique to the position pointing device is stored. The ID code can be returned to the tablet. The ID code may be a fixed value indicating the type and/or the function of the position pointing device or a unique value may be assigned to each position pointing device.

Referring to FIG. 10, the variable resistor 46 is a rotation type and the resistance thereof varies in accordance with the operation of the dial 62 shown in FIG. 11. A voltage generated due to voltage-division performed by the variable resistor 46 and the resistor 47 is applied to an AD conversion terminal (P8) of the CPU 45, and the CPU 45 converts the applied voltage into a digital value.

The variable capacitor 48 has capacitance that varies in response to a writing pressure and is a known capacitor that varies in electrostatic capacity in accordance with the amount of writing pressure applied to the pen tip 61 shown in FIG. 11. The variable capacitance 48 is connected to a terminal P6 of the CPU 45 and the resistor 49 is connected between the terminal P6 and a terminal P5. The variable capacitor 48 and the resistor 49 constitute a time-constant circuit.

The resonant circuit 11 supplies a signal, which has the same frequency as a frequency transmitted from the tablet, to a terminal P9 of the CPU 45 via the capacitor 50. The CPU 45 has a counter (timer) circuit therein. The counter circuit counts the number of signals input from the terminal P9 for a period of time corresponding to a time constant of the variable capacitor 48 and the resistor 49 to thereby detect a value corresponding to a writing pressure applied to the variable capacitor 48. Technologies for such processing are disclosed in, for example, Japanese Unexamined Patent Application Publication No. 7-178572 and U.S. Pat. No. 5,679,930.

Operation of Third Embodiment

The operation of the third embodiment having the above-described configuration will now be described.

When the position pointing device shown in FIG. 10 is placed on a tablet and a voltage across the capacitor 14 reaches a specified value, the CPU 45 starts operation. The CPU 45 first performs the following processing as initial setting. The CPU 45 puts terminals P0, P1, P2, P4, P6, P8, P9, P10, and P11 into input states. The CPU 45 also puts the terminal P3 into a high level output state and puts the terminals P5 and P7 into low level output states. Subsequently, the CPU 45 performs setting so as to start in response to the rising edge of a signal from the terminal P2 and goes into the sleep state.

In the present embodiment, a plurality of pieces of operational information and the ID code of the position pointing device are returned. In this case, the CPU 45 determines which information to be returned in accordance with information (a command) transmitted as two-bit data from the tablet. That is, when the command transmitted from the tablet is [0, 0], writing-pressure information detected by the variable capacitor 48 and information of operation of switches S1 and S2 are returned. When the command is [0, 1], an ID code stored in the ROM is returned. Further, when the command is [1, 0], information corresponding to a dial operation detected by the variable resistor 46 is returned.

Examples of a technology for transmitting a command from a tablet to a position pointing device are disclosed in Patent Document 3 and Japanese Unexamined Patent Application Publication No. 8-30374.

(a) Operation for Reception of Command [0, 1]

Figure 12:
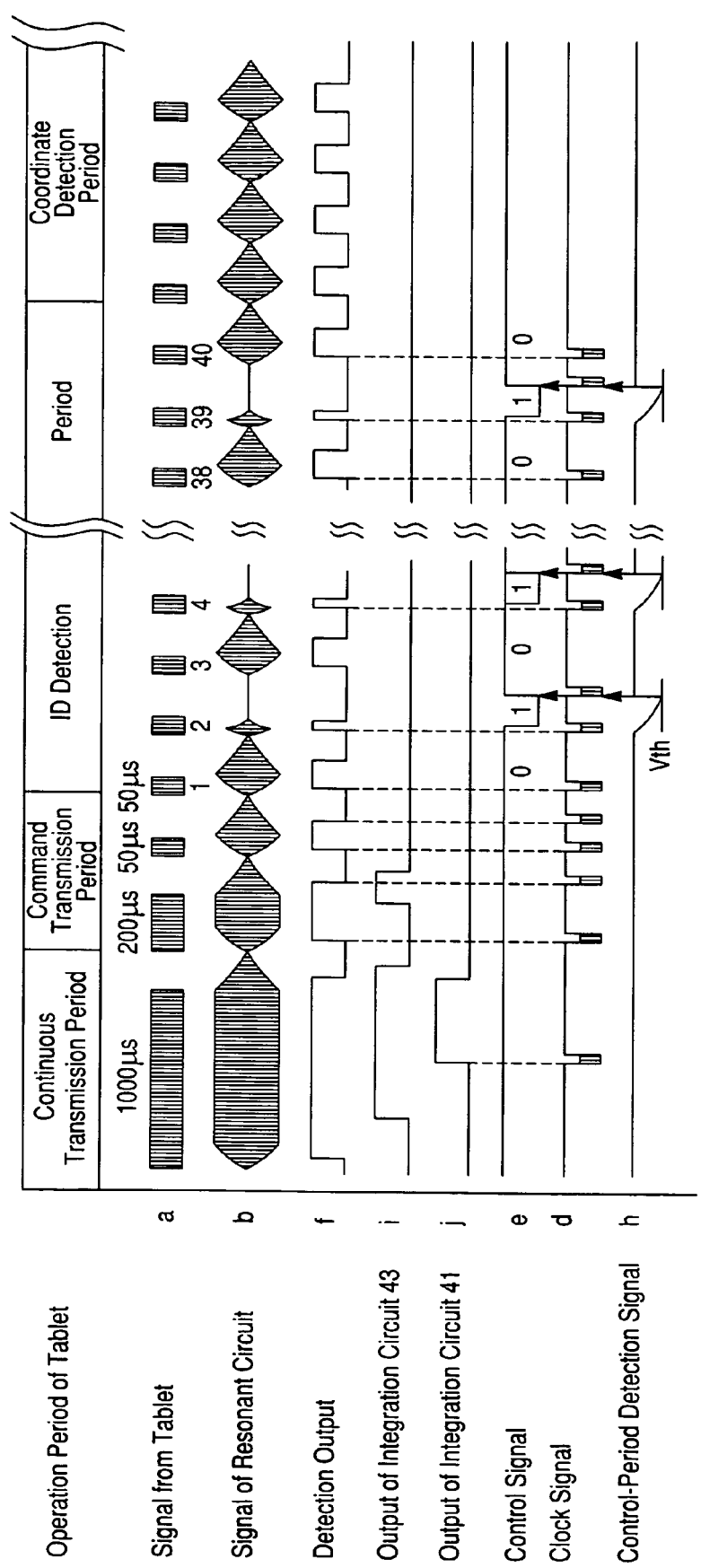
FIG. 12 is a waveform view of an operation when a command [0, 1] is received in the third embodiment.

FIG. 12 shows an operation when two-bit data of [0, 1] is received as a command from the tablet. In this case, a 40-bit ID code stored in the position pointing device is returned.

Referring to FIG. 12, waveforms (a) to (j) correspond to signal waveforms of the portions indicated by the same reference characters shown in FIG. 10. The tablet performs a long transmission of about 1000 μs. In response to this long transmission, first, a signal (i) output from the integration circuit 43 having a shorter time constant rises. At this point, the CPU 45 does not start operation.

Subsequently, a signal (j) output from the integration circuit 41 having a longer time constant rises. In response to the rising of the signal (j), the CPU 45 starts operation. The CPU 45 prepares for receiving a command from the tablet at the next start. The CPU 45 then performs setting so as to start in repose to the rising edge of a signal from the terminal P0 and then goes into the sleep state.

Subsequently, in order to transmit data of "1" corresponding to the low-order bit of the command to the position pointing device, the tablet performs a transmission for a period of about 200 μs. In response to the transmission, the terminal P0 of the CPU 45 rises and then the CPU 45 prepares for storing the first bit of the command from the tablet. The CPU 45 then performs setting so that the next start is initiated in response to the falling edge of the terminal P0 and then goes into the sleep state. When the transmission of about 200 μs is finished and the signal from the terminal P0 falls, the CPU 45 starts operation. At this point, since the terminal P1 is at a high level as shown in FIG. 12, the CPU 45 stores the first bit of the command from the tablet as "1".

Subsequently, in order to transmit data of "0" corresponding to the high-order bit of the command to the position pointing device, the tablet performs a short transmission of about 50 μs. In response to the transmission, the terminal P0 of the CPU 45 rises and then the CPU 45 prepares for storing the second bit of the command from the tablet. The CPU 45 then performs setting so that the next start is initiated in response to the falling edge of the terminal P0 and goes into the sleep state. When the short transmission of about 50 μs is finished and the signal from the terminal P0 falls, the CPU 45 starts operation. At this point, since the terminal P1 is at a low level as shown in FIG. 12, the CPU 45 stores the second bit of the command from the tablet as "0".

Having detected the command as [0, 1] as described above, the CPU 45 prepares for sequentially returning a 40-bit ID code, which is data corresponding to the command [0, 1]. The CPU 45 then performs setting so that the next start is initiated in response to the rising edge of the terminal P0 and goes into the sleep state.

In order to detect first-bit data of the ID code of the position pointing device, the tablet performs a short transmission of about 50 μs. In response to the transmission, the terminal P0 of the CPU 45 rises and then the CPU 45 starts operation. In this case, the processing varies depending on the value of the first bit of the ID code.

When the first bit of the ID code is "0", the CPU 45 performs setting so that the next start is initiated in response to the rising edge of the terminal P0 and then goes into the sleep state.

When the first bit of the ID code is "1", the CPU 45 sets the terminal P3 to a low level, performs setting so that the next start is initiated in response to the falling edge of the terminal P4, and goes into the sleep state. When the level of the terminal P3 goes low, charge stored in the capacitor 34 is discharged by the resistor 35. Thus, after a certain amount of time elapses, the terminal P4 of the CPU 45 reaches a threshold $V_{th}$. As a result, the CPU 45 starts operation. The CPU 45 returns the level of the terminal P3 to high, performs setting so that the next start is initiated in repose to the rising edge of the terminal P0, and goes into the sleep state.

Subsequently, in order to detect the second bit data of the ID code of the position pointing device, the tablet performs a short transmission of about 50 μs. In this case as well, the CPU 45 performs processing similar to that for the first bit in accordance with data to be returned. FIG. 12 shows operational waveforms of a case in which the first bit of the ID code is "0" and the second bit is "1".

As described above, when the CPU 45 sets the terminal P3 to a low level in order to return data of "1", the positive half cycle of a signal generated in the resonant circuit 11 is absorbed by the terminal P3 of the CPU 45 via the diode 51 and is eliminated. When the positive half cycle of the signal generated in the resonant circuit 11 disappears, the negative half cycle of the signal also disappears because of a characteristic of the resonant circuit 11. Thus, after the transmission of 50 μs, the tablet detects no signal and thus detects that the return data is "1".

The period for controlling the resonant circuit 11 is determined in accordance with a time constant of the resistor 35 and the capacitor 34 and is preferably about 70 to 100 μs in the present embodiment as in the second embodiment.

When the tablet starts a 40th transmission subsequent to the transmission of the two-bit command, the position pointing device returns a final bit data of the ID code, in the same manner described above. In this case, the CPU 45 performs setting so that the next start is initiated in response to the rising edge of the terminal P2 rather than the terminal P0, and then goes into the sleep state. This is because the transmission of all ID data is completed and, thereafter, the CPU 45 does not need to operate while the tablet continuously performs transmission/reception for detecting the coordinates of the position pointing device.

(b) Operation for Reception of Command [1, 0]

Figure 13:
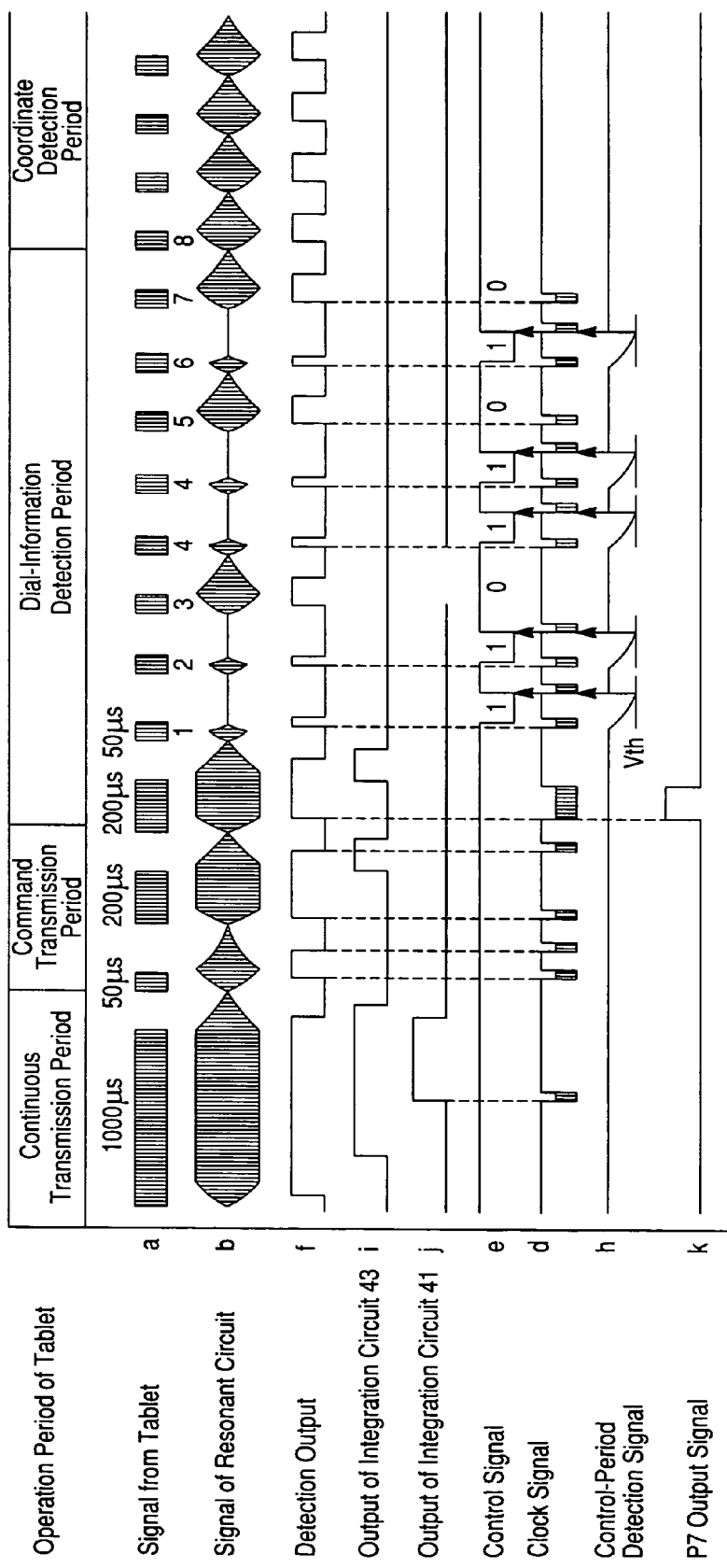
FIG. 13 is a waveform view of an operation when a command [1, 0] is received in the third embodiment.

FIG. 13 shows an operation when two-bit data of [1, 0] is received as a command from the tablet. Information corresponding to a dial operation detected by the variable resistor 46 is returned.

Referring to FIG. 13, waveforms (a) to (k) correspond to signal waveforms of the portions indicated by the same reference characters shown in FIG. 10. In FIG. 13, an operation until a two-bit command is received is analogous to the above-described operation of the case in which the command [0, 1] is received. Upon receiving a command [1, 0] from the tablet, the CPU 45 performs setting so that the next start is initiated in response to the rising edge of the terminal P0 and then goes into the sleep state.

Since the command transmitted from the tablet is [1, 0], the tablet performs a transmission of about 200 μs. This transmission of about 200 μs is not intended to indicate "1" as the command described above, but is used to provide a period of time enough for the CPU 45 to perform AD conversion. When the transmission of 200 μs is started, the terminal P0 rises to cause the CPU 45 to start operation. Subsequently, the CPU 45 sets the terminal P7 to a high level. The CPU 45 then performs AD conversion on a voltage applied to the terminal P8. Upon completing the AD conversion, the CPU 45 returns the terminal P7 to a low level. The CPU 45 further converts the result of the AD conversion into eight-bit data, which is a value corresponding to an operation of the dial 62, and stores the value.

The transmission of 200 μs is performed in this case in order to prevent the AD conversion operation from reducing a voltage across the capacitor 14. The transmission, however, may be eliminated. That is, upon finding that a command transmitted from the tablet is [1, 0], the CPU 45 may immediately perform the AD conversion.

Upon storing the eight-bit data corresponding to an operation of the dial 62, the CPU 45 performs setting so that the next start is initiated in response to the rising edge of the terminal P0 and then goes into the sleep state.

In order to detect the eight-bit data corresponding to an operation of the dial 62, the tablet repeats a short transmission of about 50 μs eight times. An operation therefor is performed in the same manner as in the case for returning the above-described ID code.

When the eighth transmission is started, the CPU 45 returns final data of the eight-bit data. In this case, the CPU 45 performs setting so that the next start is initiated in response to the rising edge of the terminal P2 rather than the terminal P0 and then goes into the sleep state. This is because the transmission of the eight-bit data is completed and, thereafter, the CPU 45 does not need to operate while the tablet continuously performs transmission/reception for detecting the coordinates of the position pointing device.

(c) Operation for Reception of Command [0, 0]

Figure 14:
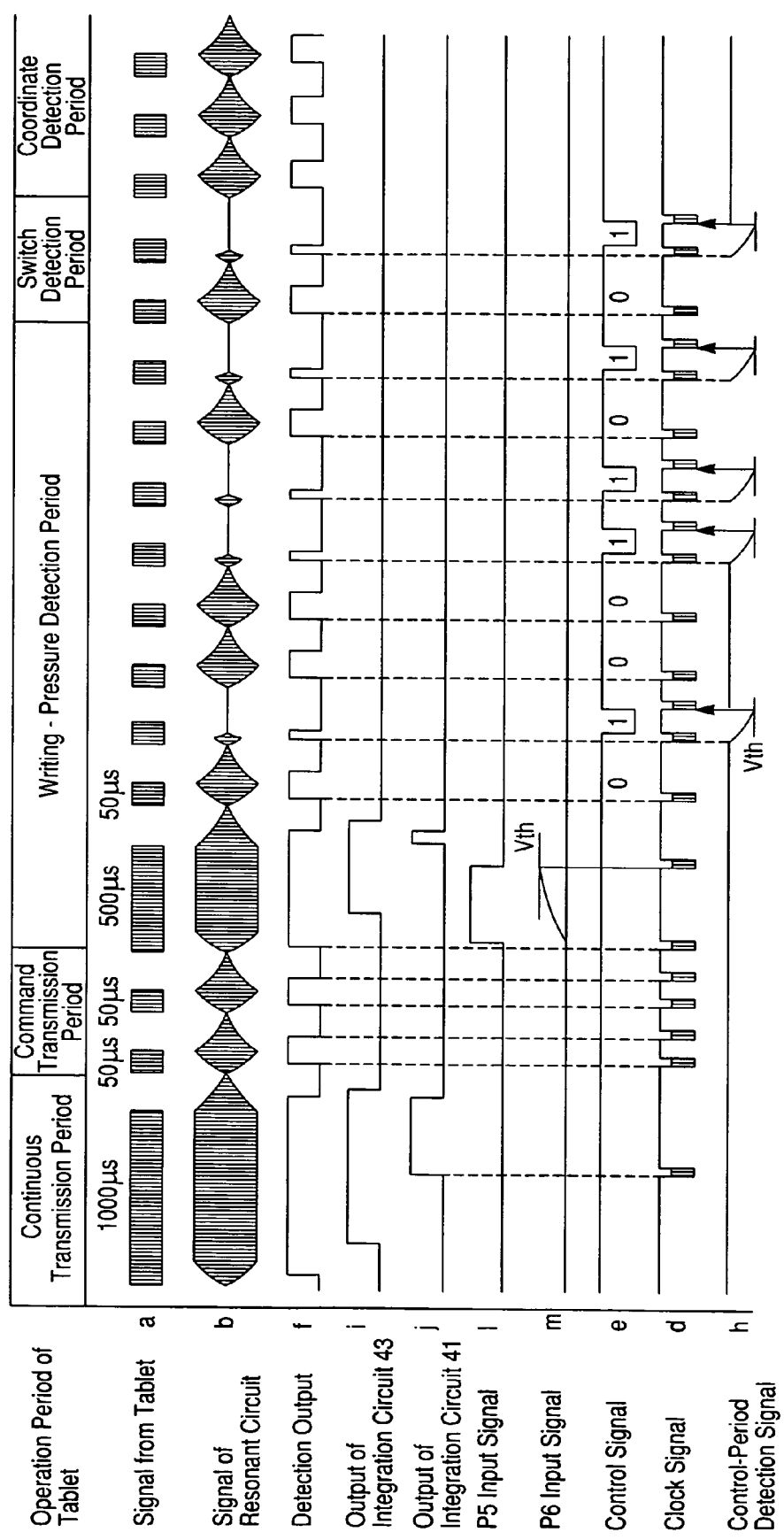
FIG. 14 is a waveform view of an operation when a command [0, 0] is received in the third embodiment.

FIG. 14 shows an operation when two-bit data of [0, 0] is received as a command from the tablet. In this case, writing-pressure information detected by the variable capacitor 48 and operational information of the switches S1 and S2 are returned.

Referring to FIG. 14, waveforms (a) to (m) correspond to signal waveforms of the portions indicated by the same reference characters shown in FIG. 10. In FIG. 14, the operation until a two-bit command is received is analogous to the above-described operation. Upon storing the command [0, 0] from the tablet, the CPU 45 performs setting so that the next start is initiated in response to the rising edge of the terminal P0 and goes into the sleep state.

Since the command transmitted from the tablet is [0, 0], the tablet performs a transmission of about 500 µs. In response to the transmission of about 500 µs, the time of charging performed by the variable capacitor 48 and the resistor 49 is detected to thereby allow detection of a writing pressure applied to the variable capacitor 48, as described below.

When the transmission of 500 µs is started, a signal of the terminal P0 rises to cause the CPU 45 to start operation. The CPU 45 performs control so that the counter (timer) circuit built into the CPU 45 is operated in response to a high-frequency signal input from the terminal P9. Further, the CPU 45 sets the terminal P5 to a high level so that the time of charging performed by the variable capacitor 48 and the resistor 49 is detected. The CPU 45 performs setting so that the next start is initiated in response to the rising edge of a signal from the terminal P6 and goes into the sleep state. In this case, the counter circuit in the CPU 45 is adapted so that it can count high-frequency signals from the terminal P9 even in a sleep period.

When a voltage across the variable capacitor 48 reaches a threshold voltage $V_{th}$ of the terminal P8, the CPU 45 starts operation. The CPU 45 immediately stops the operation of the counter (timer) circuit and stores the counted value. This value indicates the length of time corresponding to the value of the variable capacitor 48, i.e., a writing-pressure value. The CPU 45 converts the value into writing-pressure data expressed in eight bits and stores the data. Subsequently, the CPU 45 sets the terminal P5 to a low level, performs setting so that the next start is initiated in response to the rising edge of the terminal P0, and goes into the sleep state.

In the present embodiment, during a period in which the time of charging performed by the variable capacitor 48 and the resistor 49 is detected, the CPU 45 is in the sleep state to reduce electrical current consumption. This is one feature of the present invention.

The CPU 45 performs a short transmission of 50 µs for 10 consecutive times, and performs an operation for returning two-bit switch data subsequent to the eight-bit writing data in the same manner described above. FIG. 14 shows a case in which the writing-pressure data is "1, 0, 1, 1, 0, 0, 1, 0" and the switch data is "1, 0".

When a transmission for detection of the last data is started, the CPU 45 returns the last data, i.e., the state of the switch S2. In this case, the CPU 45 performs setting so that the next start is initiated in response to the rising edge of the terminal P2 rather than the terminal P0 and goes into the sleep state. This is because the transmission of all data is completed and, thereafter, the CPU 45 does not need to operate while the tablet continuously performs transmission/reception for detecting the coordinates of the position pointing device.

Extensions of Third Embodiment

Although the two-bit command is transmitted subsequent to the long transmission of 1000 µs in the present embodiment, the order may be reversed. In such a case, the arrangement may be such that the first start of the CPU 45 is initiated in response to the rising edge of a signal from the terminal P1 rather than the terminal P2.

In addition, a command from the tablet is not limited to two bits, and a command having more bits may be used so that more types of information can be returned.

In the present embodiment, in order to detect the time of charging performed by the variable capacitor 48 and the resistor 49, the number of signal waves generated in the resonant circuit 11 is counted. For this technology, one disclosed in Japanese Unexamined Patent Application Publication No. 7-176672 (U.S. Pat. No. 5,679,930) may be used. A clock signal generated by the CPU 45 may be used to detect the time, instead of the signal generated by the resonant circuit. In such a case, the CPU 45 is adapted so that it goes into the sleep state during the period of the detection.

In the present embodiment, information returned by controlling the ON or OFF state of a signal of the resonant circuit is all expressed by only a value "0" or "1". The arrangement, however, may be such that the characteristics of the resonant circuit 11 are sequentially varied at specific timing.

In the present embodiment, although a command from the tablet is used only to select information to be returned, the command may be used to control the detection of rotation information of the position pointing device as disclosed in Japanese Unexamined Patent Application Publication No. 8-30374 (U.S. Pat. No. 5,644,108).

For the tablet for use in the present embodiment, one having a configuration for detecting information of an operation or the like as a signal level in accordance with the presence/absence of a signal from the position pointing device may be used. Examples include those having configurations disclosed in a first embodiment of Japanese Unexamined Patent Application Publication No. 8-171448 (U.S. Pat. No. 5,898,136) and Japanese Unexamined Patent Application Publication No. 8-30374 (U.S. Pat. No. 5,644,108).

I claim:

1. A position pointing device comprising:
  a resonant circuit;
  a resonance-characteristic control circuit for controlling characteristics of the resonant circuit in accordance with pointing-device information at timing synchronized with at least part of an electromagnetic wave that is intermittently transmitted from a tablet and for returning the pointing-device information to the tablet;
  a clock oscillator circuit for generating a clock signal for driving the resonance-characteristic control circuit;
  clock starting means for stopping an operation of the clock oscillator circuit when a start condition is set thereby placing the resonance-characteristic control circuit in a sleep state wherein the clock signal does not vary, and the clock starting means for starting the operation of the clock oscillator circuit when the resonant circuit generates a signal specified by the start condition, wherein the start condition specifies that, in response to what type of signal generated at the resonant circuit, the clock oscillator circuit is to be started; and
  start-condition setting means for setting the start condition in the clock starting means at timing in accordance with an operation of the resonance-characteristic control circuit, the start condition corresponding to content of controlling performed by the resonance-characteristic control circuit.

2. The position pointing device according to claim 1, wherein the clock oscillator circuit operates in accordance with a charging/discharging operation of a capacitor, the charging/discharging operation being controlled by the clock starting means so as to be put into an operating or stopped state.

3. The position pointing device according to claim 1, further comprising number-of-transmission counting means for counting the number of transmissions when the tablet intermittently transmits an electromagnetic wave, wherein, when the number of transmissions counted by the number-of-transmission counting means reaches a predetermined value, the resonance-characteristic control circuit controls the characteristics of the resonant circuit in accordance with specific information in the pointing-device information.

4. The position pointing device according to claim 3, further comprising a time-constant circuit for setting a period in which the resonance-characteristic control circuit performs controlling, wherein generation of a signal from the time-constant circuit is used together as one start condition set by the start-condition setting means.

5. The position pointing device according to claim 3, wherein an electromagnetic wave that is intermittently radiated from the tablet with at least first and second duration times is received, and when an electromagnetic wave that is transmitted with the first duration time is received, the counting of the number of transmissions of the electromagnetic wave that is repeatedly transmitted with the second duration time is started.

6. The position pointing device according to claim 3, further comprising transmission-duration-time detecting means for receiving an electromagnetic wave that is intermittently transmitted from the tablet with at least two duration times and for detecting duration time of each transmission of the electromagnetic wave, the electromagnetic wave including control information for the position pointing device; and control-information extracting means for extracting the control information transmitted from the tablet in accordance with each detected individual transmission duration time or a combination of the transmission duration times, wherein the characteristics of the resonant circuit are controlled in accordance with predetermined pointing-device information based on the extracted control information.

7. The position pointing device according to claim 6, wherein the transmission-duration-time detecting means comprises transmission-duration-time determining means that comprises an integration circuit having a predetermined time constant and a comparator.

8. The position pointing device according to claim 3, further comprising continuous-amount detecting means for detecting information corresponding to an operation expressed in a continuous amount; and analog-to-digital converting means for converting the detected continuous amount into a digital value, wherein the characteristics of the resonant circuit are sequentially controlled in accordance with the continuous amount converted into the digital value.

9. The position pointing device according to claim 8, wherein the continuous-amount detecting means comprises a time constant circuit that includes an element having a continuously-variable characteristic, and the continuous-amount detecting means detects the continuous amount by counting the number of signal waves generated at the resonant circuit during a period defined by a time constant of the time-constant circuit, and wherein generation of a signal from the time-constant circuit is used together as one start condition set by the start-condition setting means.

10. The position pointing device according to claim 1, further comprising a power extracting circuit for extracting power from the signal generated at the resonant circuit.

11. A method for transmitting information from a cordless, batteryless pointing device to a digitizer or tablet configured to detect the position of the pointing device, comprising the method steps of:
(a) providing a digitizer adapted to transmit an electromagnetic digitizer signal at a first selected frequency;
(b) providing a cordless, batteryless pointing device including a resonant circuit that is responsive to the electromagnetic digitizer signal to generate a pointing device resonant signal;
(c) transmitting an electromagnetic digitizer signal at the first selected frequency from the digitizer to the pointing device and, in response, generating a pointing device resonant signal;
(d) generating a supply voltage from the pointing device resonant signal; and
(e) generating a pointing device clock signal from the pointing device resonant signal;
(f) providing a pointer resonance characteristic control circuit in the pointing device and connected to the resonant circuit, the pointer resonance characteristic control circuit being responsive to the pointing device clock signal;
(g) supplying power to the pointer resonance characteristic control circuit from the supply voltage;
(h) actuating the pointer resonance characteristic control circuit in response to the pointing device clock signal; and
(i) placing the pointer resonance characteristic control circuit in a sleep state wherein the clock signal does not vary.

12. The method for transmitting information of claim 11, wherein the pointer resonance characteristic control circuit comprises a microprocessor, the microprocessor being programmed for:
(i) placing the microprocessor in a sleep state.

13. The method for transmitting information of claim 12, further comprising:
(j) sensing a rising edge of a selected signal at a pointing device circuit terminal, and, in response,
(k) waking the pointer microprocessor from the sleep state.

14. The method for transmitting information of claim 13, further comprising:
(l) reading at least one signal having a pointer input value from a selected pointer circuit terminal; and
(m) storing the pointer input value.

15. The method for transmitting information of claim 14, further comprising:
(n) detecting that the pointing device clock signal is not present for a selected interval; and
(o) placing the microprocessor in the sleep state.

16. The method for transmitting information of claim 11, wherein step (c), transmitting an electromagnetic digitizer signal at the first selected frequency from the digitizer to the pointing device and, in response, generating the pointing device resonant signal, comprises:
(c1) continuously transmitting an electromagnetic digitizer signal at the first selected frequency for a first transmission period; and
(c2) transmitting an electromagnetic digitizer command transmission signal at the first selected frequency for a second command transmission period.

17. The method for transmitting information of claim 16, further comprising:
- (c3) transmitting an electromagnetic digitizer dial information detection signal at the first selected frequency for a third period.

18. The method for transmitting information of claim 17, further comprising:
- (c4) transmitting an electromagnetic digitizer coordinate detection signal at the first selected frequency for a fourth period.

* * * * *